C. KNOPF.
SPEED INDICATOR.
APPLICATION FILED MAY 24, 1907. RENEWED MAY 15, 1909.
933,467.
Patented Sept. 7, 1909.
2 SHEETS—SHEET 1.
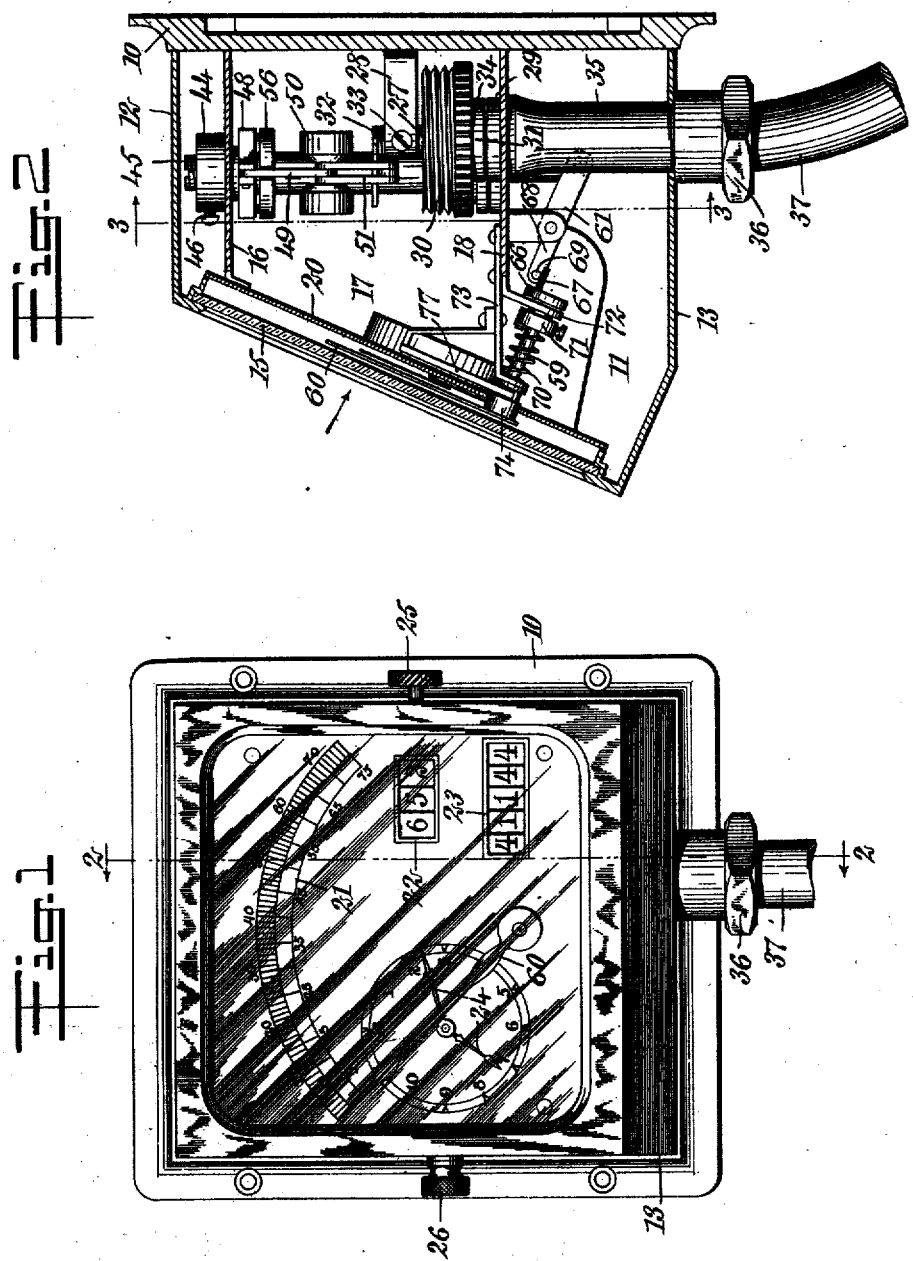
WITNESSES
INVENTOR
Carl Knopf
BY Munn & Co.
ATTORNEYS C. KNOPF.
SPEED INDICATOR.
APPLICATION FILED MAY 24, 1907. RENEWED MAY 15, 1909.
933,467.
Patented Sept. 7, 1909.
2 SHEETS—SHEET 2.
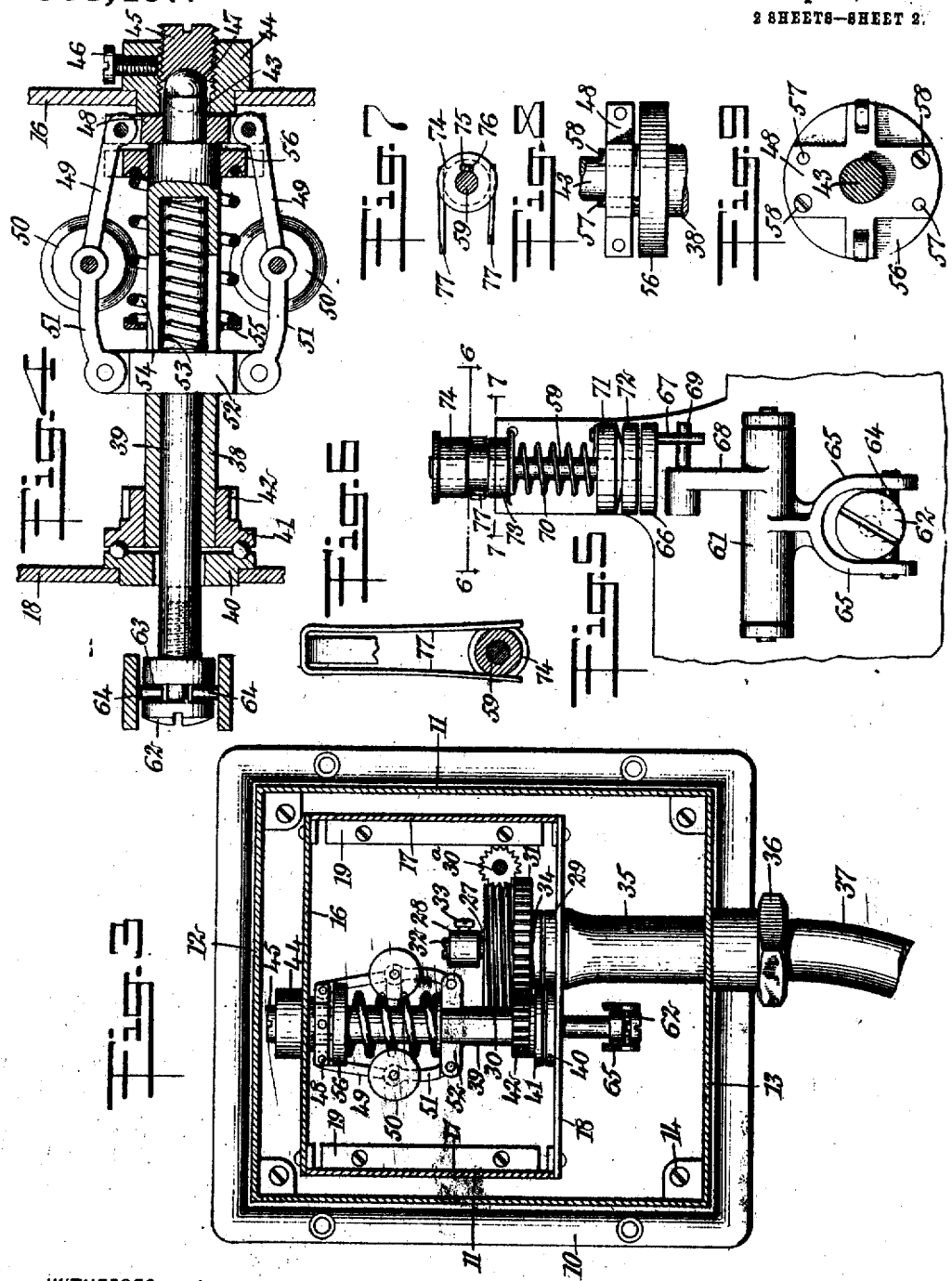
WITNESSES
F. D. Sweet.
C. W. Fairbank
INVENTOR
Carl Knopf
BY Munn & Co.
ATTORNEYS

UNITED STATES PATENT OFFICE.

CARL KNOPF, OF NEW YORK, N. Y., ASSIGNOR TO HICKS SPEED INDICATOR COMPANY, OF BROOKLYN, NEW YORK, A CORPORATION.

SPEED-INDICATOR.

933,467. Specification of Letters Patent. Patented Sept. 7, 1909.

Application filed May 24, 1907, Serial No. 375,535. Renewed May 15, 1909. Serial No. 496,306.

*To all whom it may concern:*

Be it known that I, CARL KNOPF, a citizen of the United States, and a resident of the city of New York, borough of Brooklyn, in the county of Kings and State of New York, have invented a new and Improved Speed-Indicator, of which the following is a full, clear, and exact description.

This invention relates to certain improvements in speed indicators, and more particularly to that type of indicator adapted for showing the speed of rotating parts, or of a vehicle having rotating parts, the speed being indicated upon a dial reading in revolutions per minute, miles per hour, or other suitable standard; the indicator being of that type in which a rotating ball governor is employed, the variations in the speed of rotation serving to throw the balls outward to a greater or less extent and to control the movements of the hand or pointer.

One object of the invention is to provide an improved tension means for controlling the movements of the ball governor, said means including two separate springs, one end of said springs operating while the indicator is rotated at low speed, while both of the springs come into play when the speed increases beyond a predetermined limit, and in connection with these springs I provide certain improved means for adjusting the tension of the springs at will.

A further object of the invention is to provide an improved mechanism, whereby the longitudinal movement of the member operated by the ball governor may be converted into rotary movement for the operating of the indicating hand or pointer, said mechanism being so constructed as to readily respond to the slightest movement on the part of the governor, but, at the same time, to permit of a very slight vibration in the movement of said governor due to the jarring or vibration of the instrument, without transmitting said vibration to the hand or pointer; thus permitting the pointer to remain stationary when the vehicle is running at a uniform speed over comparatively rough ground.

The invention consists in certain features of construction and combinations of parts, all of which will be fully set forth hereinafter and particularly pointed out in the claims.

Reference is to be had to the accompanying drawings, forming a part of this specification, in which similar characters of reference indicate corresponding parts in all the figures, and in which—

Figure 1 is a front elevation of an indicator constructed in accordance with my invention and inclosed within a suitable casing; Fig. 2 is a transverse section taken on the line 2—2 of Fig. 1; Fig. 3 is a transverse section taken on the line 3—3 of Fig. 2; Fig. 4 is a sectional detail showing the governor shaft and mechanism operatively connected thereto; Fig. 5 is a detail illustrating the construction of the pointer shaft and mechanism for transmitting motion thereto from the governor shaft; Fig. 6 is a sectional detail taken on the line 6—6 of Fig 5; Fig. 7 is a sectional detail on the line 7—7 of Fig. 5; Fig. 8 is a detail showing the means for adjusting the tension of the outer spring; and Fig. 9 is a plan view of the parts shown in Fig. 8.

In my improved indicator, I inclose the operating mechanism within a suitable casing adapted to be secured in place to any suitable support, as, for instance, the dashboard of a vehicle, and a flexible shaft or other suitable means is provided for transmitting the motion from a rotating part of the vehicle to the mechanism of the indicator. The front side of the indicator is provided with a scale and a pointer or hand, and the mechanism of the indicator serves to indicate upon the scale the speed at which the vehicle is traveling. In the specific construction illustrated, the casing comprises a base plate 10 having openings through the outer flange thereof, whereby screws may be inserted. Rigidly secured to the base plate are the side walls 11, the top wall 12, and the bottom wall 13 of the outer casing, said walls being provided with inwardly directed lugs 14 adjacent their base, through which suitable screws may be inserted. The outer casing is provided with an inclined front wall 15 formed of glass, whereby the movements of the pointer upon the indicator may be readily observed.

Within the outer casing and also rigidly secured to the base plate 10, I provide an inner casing having a top wall 16, side walls 17, and a bottom wall 18, said side walls being provided with base flanges or lugs 19 for the insertion of screws to hold the inner casing to the base plate. The inner casing serves as a support for the operating mechanism, and the front wall 20 of the inner casing lies closely adjacent and substantially parallel to the glass front wall 15 of the outer casing. The face wall 20 is provided with a curved scale 21 along which moves the pointer of the indicating mechanism.

In connection with the speed indicating mechanism, I preferably provide distance-recording mechanism, and also a small clock for indicating the time. The distance-recording mechanism is not illustrated in detail, inasmuch as the construction thereof involves no portion of the invention herein claimed, but the face plate 20 is illustrated as being provided with two openings 22 and 23, through which the series of numbers indicating the length of the trip and the total run of the season, may be observed. The clock is preferably carried by the face plate 20, and the hands 24 thereof move about a dial marked on said face plate 20. The outer casing may be provided with a suitable key 25, whereby the trip total of the distance-recording mechanism may be reset at zero, and may also be provided with a suitable key 26, whereby the clock may be wound, without opening the casing.

Mounted within the inner casing, I provide three separate rotatable members, one of which serves as the drive shaft and is provided with means for connecting the same to the transmission mechanism, the second of which includes the governor mechanism, and the third of which includes the pointer and its supporting spindle. The driving member comprises a shaft 27 having its upper end mounted within a bracket 28 and its lower end mounted in a bearing 29 carried by the bottom wall 18 of the inner casing. Rigidly secured to this shaft, I provide a worm gear 30 adapted for the operation of the odometer, or distance-recording mechanism, one pinion 30ª of which is illustrated in Fig. 3, and also provide a gear wheel 31 adapted for transmitting motion to the second rotatable member or governor mechanism. The upper end of the shaft 27 is preferably provided with a recess oppositely disposed to a corresponding recess in the inner end of a screw stud 32. Between the end of the shaft and said stud, there is provided a suitable ball constituting the bearing for the end of the shaft, said bearing being adjustable by the longitudinal movement of the screw stud, and adapted to be rigidly secured in the desired position by a suitable set screw 33. The construction of this bearing is identical with the construction of the end bearing for the governor shaft, specific details of which are clearly illustrated in Fig. 4. The bearing 29 is provided with a raceway upon one surface thereof serving for the reception of a series of balls interposed between said bearing and a collar 34 carried by the shaft.

Surrounding the lower end of the shaft and rigidly secured to the bottom wall 18, I provide a sleeve 35 screw-threaded for the reception of the coupling nut 36 of the hollow cable 37 of the motion-transmitting mechanism. The cable 37 is non-rotatable, but serves to protect the rotatable flexible shaft which extends therethrough and through the sleeve 35 for operative engagement with the end of the shaft 27.

The second rotatable member of my improved speed indicator includes the centrifugally operated governor weights, the specific construction of which is most clearly shown in Figs. 4, 8 and 9. Extending from the top wall 16 to the bottom wall 18 of the inner casing, there is provided a hollow shaft 38, supporting the governor ball and having a rotatable longitudinally movable rod 39 mounted therein. The wall 18 is provided with a bearing member 40 secured thereto and having a raceway for the reception of a series of balls held in place by an oppositely disposed bearing member 41 carried by the hollow shaft 38. The shaft 38 terminates at the lower end of the bearing member 41, and the balls serve not only to support the shaft, but to resist longitudinal movement. The shaft is provided with a gear wheel 42 rigidly secured thereto and adapted to intermesh with the gear wheel 31 of the drive shaft, whereby the hollow shaft is caused to rotate. The opposite end of the hollow shaft may, if desired, be closed and terminates in a stud 43 extending into a bearing block 44. The latter is provided with a screw-threaded stud 45 rigidly held in place by a set screw 46, and interposed within the bearing block 44 and between the ends of the stud 43 and threaded stud 45, and fitting within recesses in both, is a ball 47 serving to support the shaft and also to resist end thrust.

Rigidly secured to the stud 43, I provide a collar 48 having pivotally secured thereto at opposite sides the arms 49 which support the balls or weights 50. These balls or weights are also pivotally connected to arms 51, which connect to a cross bar 52 extending through slots in the opposite sides of the hollow shaft. As the hollow shaft 38 is rotated, the balls tend to move outward by centrifugal force, and as the collar 48 is rigidly secured to the shaft, it is evident that the bar 52 will be moved along the slot toward said collar. The bar is secured to the longitudinally movable rod 39, which latter is operatively connected to the indicating mechanism, and springs are provided for normally holding the balls in their inner position. As shown, a spring 53 is provided within the hollow shaft and intermediate the bar 52 and the closed end of said shaft, which spring engages at all times with both the bar and said end, and normally tends to force the rod 39 out of the shaft. Surrounding the hollow shaft and intermediate the bar 52 and the collar 48, I provide a second spring 54 having its ends in engagement with collars 55 and 56 slidably mounted upon the shaft. When the device is at a state of rest, no tension whatever is exerted upon the spring 54, and either the collar 55 or the collar 56 is out of engagement with the member tending to resist longitudinal movement. As shown in Fig. 4, the collar 55 is out of engagement with the bar 52, and upon the rotation of the shaft only the spring 53 would resist the outward movement of the balls 50. As the speed increases and the spring 53 is compressed, the bar 52 is brought into engagement with the collar 55, and further increase of speed causes both of the springs to be compressed. To permit the balls to come to the innermost position, I provide oppositely disposed recesses in the collar 56 adapted to receive the arms 49, and for preventing the rotation of the collar 56 and thus preventing the recesses from being brought out of alinement with the arms, I provide pins 57 rigidly secured to the collar 56 and extending through openings in the collar 48, as is clearly indicated in Figs. 8 and 9. The collar 48 is provided with threaded set screws 58 extending therethrough and having the ends adapted to engage with the collar 56. These set screws serve to limit the movement of the collar 56 in respect to the collar 48, and, therefore, determine the limit of movement of the bar 52, and determine the time during which the spring 53 is compressed before the spring 54 comes into play.

The end of the longitudinally movable rod 39 opposite to the bar 52, is operatively connected to the indicating mechanism proper. As shown, the bottom wall 18 of the inner casing is provided with suitable supports within which the shaft 59 of the indicator mechanism proper is mounted, and secured to one end of this shaft is the hand or pointer 60, and the opposite end of the shaft is operatively connected to the end of the longitudinally movable rod 39. For effecting the operative engagement of the shaft and the rod, there is provided intermediate the two, a pivotally mounted member 61 having a yoke. This member is oscillated by the longitudinal movement of the rod, and its oscillations serve to effect the rotation of the shaft 59. The longitudinally movable rod 39 is provided with an annular groove adjacent its outer end, which groove may be formed in the shaft itself or within a separate part detachably secured thereto. To facilitate the adjustment of the device, the shaft is preferably provided with a detachable end 62 having screw-threaded engagement with the shaft, and having an annular groove 63. By rotating the member 62, the groove may be moved longitudinally in respect to the rod and the mechanism thus brought into proper alinement. The groove serves to receive two inwardly extending pins 64 carried by the yoke arms 65 of the oscillating member 61. The shaft 59 is provided with a collar 66 adjacent one end, and this collar is provided with a pin 67 eccentrically mounted and extending outward from the collar substantially parallel with the shaft. The member 61 is provided with an arm 68 having a pin 69 extending outward therefrom and lying substantially parallel to the axis of oscillations of the member. The pins 67 and 69 are normally in engagement with each other and are resiliently held in such engagement by a spring 70 surrounding the shaft, and having one end thereof rigidly secured to the support for the shaft and the other end rigidly secured to a collar 71 carried by the shaft. As the member 61 is oscillated, the pin 69 is moved laterally and moves the pin 67 to rotate the shaft, as will be clearly seen from an inspection of Fig. 5. The shaft 59 is supported in any suitable bearings, which permit the free rotation thereof and also serve to resist end thrust. As shown, the end of the bottom wall 18 of the casing is bent downward to form a bearing 72 for one end of the shaft, and is provided with a bracket arm 73 extending outward and bent downward to form a bearing for the opposite end of the shaft. The collar 71 lies closely adjacent the bearing 72 and may, if desired, be provided with a conical face to reduce the resistance to the rotation of the shaft and the collar.

Mounted upon the end of the shaft 59 is the pointer or hand 60, the connection between the pointer and the shaft being such that a very slight vibration of the shaft is permitted without causing a corresponding vibration in the pointer. To secure this object, I provide the pointer with a collar 74 loosely mounted upon the shaft and having a very short slot 75, illustrated in Fig. 7 of the drawings. The shaft is provided with a radial pin 76 lying within said slot and is also provided with a circumferential groove for the reception of two oppositely disposed spring members 77. As the shaft rotates, the pin engages with the end of the slot and causes a corresponding rotation of the collar 74 and the pointer, but if, due to jarring action, the shaft 59 oscillates back and forth to a very slight extent, the spring 70 holds the collar and pointer stationary, while the shaft and its pin oscillate within the slot 75. The slot is not long enough to interfere with the accurate reading of the instrument, but is of sufficient length to permit of the pointer being held free from any vibration, due solely to the jarring of the instrument and not due to variations in the speed of the mechanism to which the indicator is attached.

Having thus described my invention, I claim as new and desire to secure by Letters Patent:

1. In a speed indicator, a longitudinally movable member formed of two sections adjustable to vary the length of said member, centrifugal means in engagement with one section for varying the position of said member, an indicating member, and means operatively connecting said indicating member and the other section of said longitudinally movable member, whereby the length of the longitudinally movable member may be adjusted and the relation of the centrifugal means to the indicating means varied.

2. In a speed indicator, a longitudinally-movable member formed of two sections, one of which is provided with an annular groove, centrifugal means operatively connected to the other section for varying the position of the member, an indicating member, and a member pivoted intermediate its ends and having a portion in engagement with said indicating member and a portion in engagement with the annular groove of said longitudinally-movable member, the section of said longitudinally-movable member having said groove being longitudinally adjustable in respect to the remainder of the member.

3. In a speed indicator, a longitudinally-movable member formed of two sections, one of which is provided with an annular groove, centrifugal means in connection with the other section for varying the position of the member, an indicating member, and a motion-transmitting member in engagement with said indicating member and having yoke arms in engagement with the annular groove in said longitudinally-movable member, the section of said longitudinally-movable member having said groove being longitudinally adjustable in respect to the remainder of the member.

4. In a speed indicator, an indicating member having an oscillatory shaft and a pin carried thereby, said pin extending in the same general direction as said shaft and eccentrically mounted in respect thereto, a longitudinally-movable member, centrifugal means for varying the position of said member, and a member pivoted intermediate its ends and having engagement with said longitudinally-movable member, said pivoted member having a pin carried thereby and movable transversely of the axis of said shaft and in engagement with the pin of said shaft, whereby a variation in the position of the longitudinally-movable member causes an oscillation of the pivoted member and an oscillation of said shaft.

5. In a speed indicator, a longitudinally movable member, centrifugal means for varying the position of said member, a rotatable indicating member, a member pivoted intermediate its ends and having yoke arms in engagement with said longitudinally movable member and having an arm extending in the opposite direction from said yoke arms, and an eccentrically mounted pin carried by said rotatable indicating member and in engagement with said arm, whereby a variation in the position of the longitudinally movable member causes an oscillation of the pivoted member and a rotation of the indicating member.

6. A speed indicator, including a rotatable member, arms pivoted thereto, a shaft, means connecting said arms and said shaft to oscillate the latter upon the outward movement of the former due to centrifugal force, a pointer on said shaft, and lost motion connections between the pointer and the shaft, whereby the pointer is operated only by variations in the speed of rotation of said arms and is independent of the movement of the arms due to the jarring or bodily movement of the indicator.

7. In an indicator, a shaft, means operatively connected thereto for oscillating said shaft, a collar on said shaft, a pointer connected to said collar, lost motion connections between said shaft and said collar, and a spring in resilient engagement with the collar for normally holding said collar and pointer stationary and permitting a slight vibration or oscillation of the shaft.

8. In an indicator, a shaft, means operatively connected thereto for oscillating said shaft, a collar on said shaft, a pointer secured to said collar, slot and pin connections between said collar and said shaft, and a spring in resilient engagement with the collar for normally holding said collar and pointer stationary and permitting a slight vibration or oscillation of the shaft.

9. In an indicator, a shaft, means operatively connected thereto for oscillating said shaft, a pointer, and slot and pin connections between said pointer and said shaft, and resilient means in engagement with said pointer for normally holding said pointer stationary and permitting a slight vibration or oscillation of the shaft.

10. In a speed indicator, a hollow shaft, a rod extending into said shaft and longitudinally movable in respect thereto, centrifugally operated members carried by said shaft and in operative engagement with said rod, a spring surrounding said shaft, and a second spring within said shaft, both of said springs tending to resist the outward movement of said centrifugally operated members.

11. In a speed indicator, a hollow shaft, a rod extending into said shaft and longitudinally movable in respect thereto, centrifugally operated members carried by said shaft and in-operative engagement with said rod, a spring surrounding said shaft, and a second spring within said shaft, both of said springs tending to resist the outward movement of said centrifugally operated members, and one of said springs being out of operation during a portion of the movement of the other spring.

12. In a speed indicator, a hollow shaft, a rod within said shaft and longitudinally movable in respect thereto, said shaft being provided with longitudinal slots adjacent the end of said rod, centrifugally operated means secured to said shaft and extending into said slots and into engagement with said rod, a spring within said hollow shaft, and a spring surrounding said shaft, each of said springs tending to resist the outward movement of the centrifugally operated means.

13. In a speed indicator, a hollow shaft, a rod within said shaft and longitudinally movable in respect thereto, said shaft being provided with longitudinal slots adjacent the end of said rod, centrifugally operated means secured to said shaft and extending into said slots and into engagement with said rod, a spring within said hollow shaft, and a spring surrounding said shaft, each of said springs tending to resist the outward movement of the centrifugally operated means, the range of movement of one of said springs being greater than the range of movement of the other spring, whereby one spring may operate for a limited distance independently of the other spring.

14. In a speed indicator, a rotatable shaft, a collar secured thereto, centrifugal means pivotally connected to said collar, a spring surrounding said shaft and adapted to resist the outward movement of said centrifugal means, a second collar in engagement with one end of the spring, and means for adjusting the position of the last mentioned collar in respect to the first mentioned one.

15. In a speed indicator, a rotatable shaft, a collar secured thereto, centrifugal means pivotally connected to said collar, a spring surrounding said shaft and adapted to resist the outward movement of said centrifugal means, a second collar in engagement with one end of the spring, and adjustable screws carried by one of said collars and in engagement with the other for adjusting their relative positions.

16. In a speed indicator, a rotatable shaft, a collar secured thereto, centrifugal means pivotally connected to said collar, a spring surrounding said shaft and adapted to resist the outward movement of said centrifugal means, a second collar in engagement with one end of the spring, one of said collars having perforations and the other of said collars having guiding pins extending through said perforations for preventing the rotation thereof.

In testimony whereof I have signed my name to this specification in the presence of two subscribing witnesses.

CARL KNOPF.

Witnesses:
CLAIR W. FAIRBANK,
EVERARD B. MARSHALL.